(12) United States Patent
Goenka et al.

(10) Patent No.: US 12,210,555 B2
(45) Date of Patent: Jan. 28, 2025

(54) METHOD AND APPARATUS FOR BOOKMARKING A PORTION OF AN ELECTRONIC DOCUMENT

(71) Applicant: YAHOO ASSETS LLC, Dulles, VA (US)

(72) Inventors: Mohit Goenka, Santa Clara, CA (US); Nikita Varma, Milpitas, CA (US); Ashish Khushal Dharamshi, Sunnyvale, CA (US); Gnanavel Shanmugam, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 6 days.

(21) Appl. No.: 18/049,431

(22) Filed: Oct. 25, 2022

(65) Prior Publication Data
US 2024/0134899 A1 Apr. 25, 2024
US 2024/0232248 A9 Jul. 11, 2024

(51) Int. Cl.
*G06F 16/383* (2019.01)
*G06F 3/0481* (2022.01)
*H04L 51/42* (2022.01)

(52) U.S. Cl.
CPC .......... *G06F 16/383* (2019.01); *G06F 3/0481* (2013.01); *H04L 51/42* (2022.05)

(58) Field of Classification Search
None
See application file for complete search history.

(56) References Cited

U.S. PATENT DOCUMENTS

2014/0298152 A1* 10/2014 Malla ................ G06F 40/12
715/230
2017/0046770 A1* 2/2017 Wu .................. G06F 16/23

* cited by examiner

*Primary Examiner* — Eddy Cheung
(74) *Attorney, Agent, or Firm* — James J. DeCarlo; Greenberg Traurig, LLP

(57) ABSTRACT

Techniques for electronic document content bookmarking are disclosed. In one embodiment, a method is disclosed comprising receiving user input indicating selection of a portion of the electronic document, receiving a request to bookmark the selected portion of the electronic document, generating a bookmark card for the selected portion of the electronic document, the bookmark card comprising information identifying the electronic document, the selected portion of the electronic document as bookmarked content and the at least one user-defined information item, receiving, via the computing device, a bookmark view request via the GUI, and causing display of the bookmark view via the GUI in response to the bookmark view request, the bookmark view comprising an entry corresponding to the generated bookmark card and providing the bookmarked content from the generated bookmark card, the bookmark view providing a number of actions selectable by the user in connection with the entry from the bookmark view.

20 Claims, 9 Drawing Sheets

700

BOOKMARK — 702

704 — The quick brown fox jumped over the lazy dog.

706:
- Title: _____
- Note: _____
- Keywords: _____
  ⋮           ⋮

708:
- Metadata Field 1: _____
  ⋮           ⋮
- Metadata Field n: _____

710: UNDO / CANCEL    SUBMIT

Figure 7

METHOD AND APPARATUS FOR BOOKMARKING A PORTION OF AN ELECTRONIC DOCUMENT

FIELD OF THE DISCLOSURE

The present disclosure relates to improvements to electronic document processing systems, electronic document management systems, electronic messaging systems, browsers, and the like, and more specifically to enabling bookmarking of a selected portion, or portions, of an electronic document.

BACKGROUND

Electronic documents, such as electronic mail (email), text messages, word processing documents, spreadsheet documents, digital receipts, social media postings, newsletters, Web documents, etc. have come to be relied on to convey information. For example, an electronic message system user typically sends and receives a number of emails on a daily basis. Incoming emails are typically received into a folder (e.g., Inbox folder), which a user can access via a software application (e.g., an email application, or email app) and its graphic user interface (GUI). The user can open and read an email message via the GUI. In addition, an email app typically provides a mechanism for flagging, or marking, an email message for later access. The flagging mechanism can be used to differentiate between flagged and unflagged messages. An email app typically allows a user to move email messages between folders (e.g., from an Inbox folder to a saved-mail folder). The use of flagging and saving emails to folders provides a mechanism for managing and accessing emails.

However, even after flagging an email and/or moving an email to a folder, it is still difficult for a user to locate a specific email. In order to locate an email, the user has to search manually or use keywords to search for the email. In order to perform a search, the user has to remember at least a portion of the contents of the email in order to determine the keyword(s) to use for the search.

SUMMARY

The present disclosure provides novel systems and methods for electronic document content bookmarking. Embodiments of the present disclosure provide an ability to bookmark a selected portion, or portions, of an electronic document. Embodiments of the present disclosure facilitate access to, and interaction with, selected portion(s) of an electronic document. Embodiments of the present disclosure provide a number of user-selectable actions, such as without limitation, creating, viewing, managing, searching, and communicating a bookmarked portion of an electronic document.

An electronic document can be any form of electronic media content. Some non-limiting examples include electronic messages (e.g., email messages, text messages, etc.), online posts (e.g., social media posts, blog posts, etc.), newsletters, word processing documents, spreadsheet documents, Web documents, etc. Any form of electronic media content can be used with embodiments of the present disclosure.

With the substantial amount of information being stored in electronic documents, it has become difficult to make such information accessible to users. For example, a vast amount of information is contained in web pages available via a browser and the Web. However, there are very few mechanisms available to facilitate access to this vast amount of information. One mechanism that is currently available is universal resource locator (URL) bookmarking, which can be used to bookmark an entire web page. The user can instruct the browser software to display the web page by selecting the bookmarked URL. Current URL bookmarking mechanisms operate to facilitate access to a web page. None of the current bookmarking mechanisms facilitate access to a selected portion of a web page.

As another example, electronic mail messages contain a plethora of information. Currently, email software applications provide a mechanism for flagging an entire email message and/or a mechanism for organizing messages using folders. The current flagging/bookmarking and folder organization mechanisms all operate to facilitate access to an electronic document. None of the current mechanisms facilitate access to a selected portion of an electronic document.

The novel systems and methods described herein enable a selected portion, or portions, of an electronic document to be bookmarked. This presents improvements to any system, software application, platform, etc. that manages, stores, provides, etc. electronic documents.

Embodiments of the present disclosure generate an extraction card (or bookmark card) of type bookmark for bookmarked contents corresponding to a selected portion of an electronic document. The bookmark card can comprise both user-specified data and automatically-generated data and metadata.

In accordance with one or more embodiments, a user can specify a portion of an electronic document to be bookmarked. In response, a bookmark card can be generated. The bookmark card can comprise information identifying the user-selected portion (or extracted portion) of the electronic document. In accordance with one or more embodiments, the bookmark card can comprise user-defined information, or annotations, such as and without limitation a title, note, one or more search keywords, etc. In accordance with one or embodiments, the bookmark card can comprise automatically-generated information, such as an identifier (electronic document, or E-doc, ID) for the electronic document, information identifying the user (e.g., user ID), etc. By way of some non-limiting examples, the E-doc ID can be a message ID corresponding to an electronic message (e.g., an email), an article ID corresponding to an article, URL corresponding to a web page, etc.

In accordance with one or more embodiments, the bookmark card can comprise automatically-generated metadata associated with the bookmarked content. By way of a non-limiting example, a bookmark card's automatically-generated metadata can be based on a type (or category) of information included in the bookmarked content. By way of some non-limiting examples, types/categories of information can include without limitation address, phone number, sports score, stock ticker, etc. information. Each information type/category can have associated automatically-generated metadata. In some cases, the automatically-generated metadata can include at least one metadata item that can be dynamically updated (e.g., a sports score, a stock value, a current geographic distance (e.g., between a bookmarked address and another address), etc.).

Embodiments of the present disclosure can provide a number of user-selectable actions for creating, managing, interacting with, etc. bookmarked content, where the bookmarked content corresponds to a selected portion of an electronic document. By way of some non-limiting example, interacting with bookmarked content can comprise viewing, managing, flagging, organizing (e.g., by saving to a folder, or folders), searching, and communicating the bookmarked content. By way of a further non-limiting example, a bookmark list view can be provided to a user, where the listing comprises a number of entries, each entry corresponding to bookmarked content.

According to some embodiments, the disclosed systems and methods first receive a request to create a bookmark. By way of a non-limiting example, the request can be initiated via input indicating a selection of a portion of an electronic document and selection of a bookmark creation control element (e.g., a button in a menu, such as a contextual menu) displayed in a GUI of an application displaying an electronic document. By way of a further non-limiting example, the application can be an electronic mail application, a browser, a word processing application, a spreadsheet application, etc. The selected portion of the electronic document can be identified by the user at any time in connection with a bookmark creation request (e.g., before, simultaneous with, after the bookmark creation request).

According to some embodiments, the disclosed systems and methods can receive additional input from the user in connection with the bookmark creation request, where the input can comprise one or more of a title, note, one or more search keywords, etc. Additionally, disclosed systems and methods can analyze the selected portion of the electronic document and based on the analysis determine a type (or category) of information for the selected content. In accordance with one or more embodiments, contents of the electronic document, metadata associated with the electronic document, other bookmarks created using other portions of the electronic document, etc. can be used in determining a type/category of information included in the bookmarked content. The disclosed systems and method can then automatically-generate metadata based on a determined information type/category.

According to some embodiments, the disclosed systems and methods can receive input from a user indicating a type of bookmark interaction, where the input can be received via the application's GUI. By way of a non-limiting example, the GUI can include a user-selectable control to view a list of existing bookmarked content. In accordance with one or more embodiments, each entry in the list can correspond to bookmarked content and can be selectable by the user to perform one or more actions, such as and without limitation, edit information associated with bookmarked content (e.g., change the user-defined data associated with bookmarked content, change the portion of content bookmarked, etc.), delete a bookmark (or bookmarked content), copy bookmarked content, view the electronic document containing the bookmarked content, view and/or interact with some or all of the automatically-generated metadata, send bookmarked content (or a link to bookmarked content) to another user, flag bookmarked content, save bookmarked content in a folder, search for bookmarked content, etc.

In accordance with one or more embodiments, a method is disclosed which includes receiving, at a computing device, via a graphical user interface (GUI) display of an electronic document, user input indicating selection of a portion of the electronic document; receiving, at the computing device, from the user via the GUI, a request to bookmark the selected portion of the electronic document, the bookmark request comprising at least one user-defined information item; generating, via the computing device, a bookmark card for the selected portion of the electronic document, the bookmark card comprising information identifying the electronic document, the selected portion of the electronic document as bookmarked content and the at least one user-defined information item; receiving, via the computing device, a bookmark view request via the GUI; and causing, via the computing device, display of the bookmark view via the GUI in response to the bookmark view request, the bookmark view comprising an entry corresponding to the generated bookmark card and providing the bookmarked content from the generated bookmark card, the bookmark view providing a number of actions selectable by the user in connection with the entry from the bookmark view.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for electronic document content bookmarking.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 8:
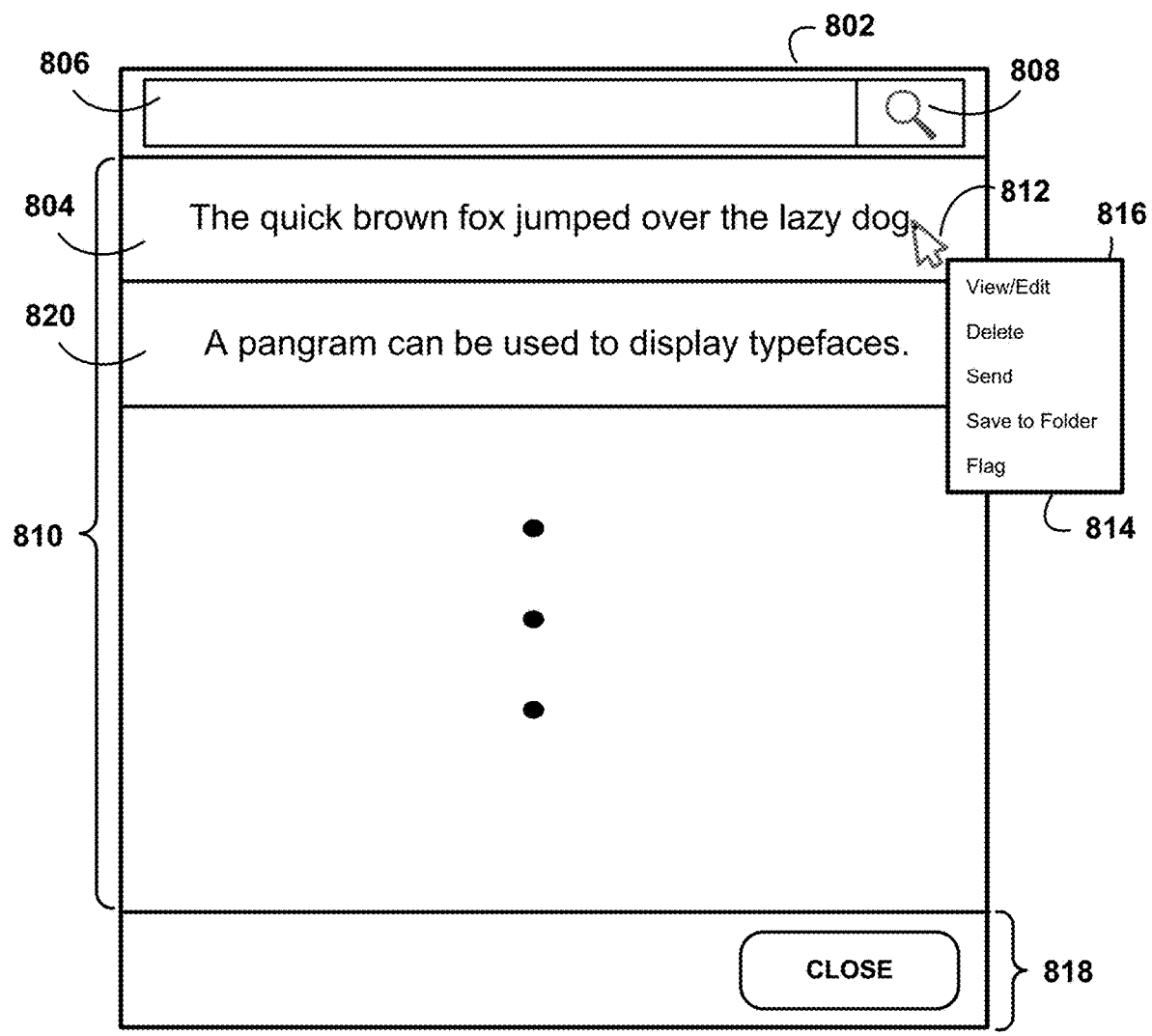
Figure 9:
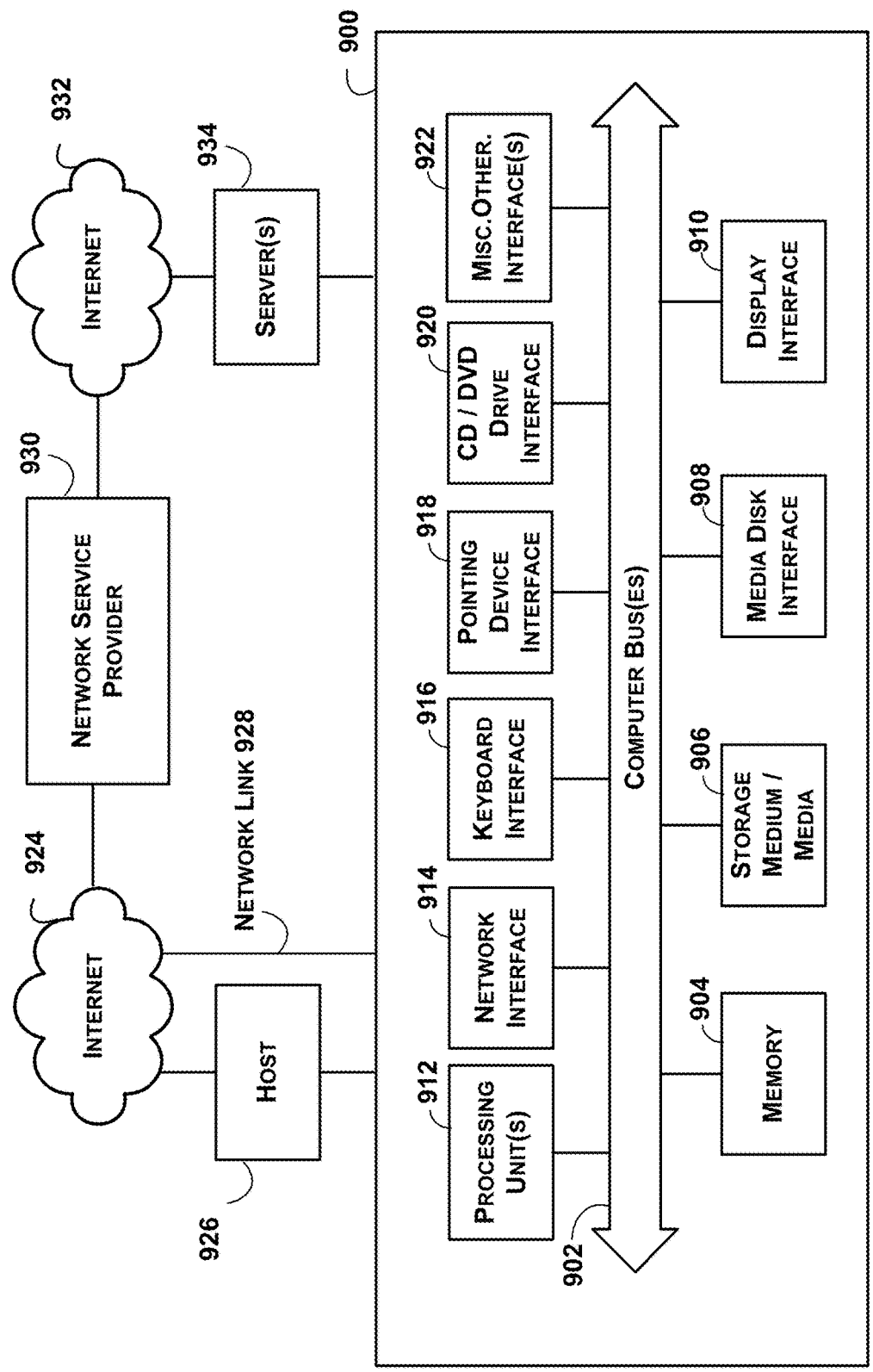

FIGS. 5-8 provide diagrams of exemplary examples for use in accordance with one or more embodiments of the present disclosure; and FIG. 9 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, an electronic document can be any form of electronic media content. Some non-limiting examples include electronic messages (e.g., email messages, text messages, etc.), online posts (e.g., social media posts, blog posts, etc.), newsletters, word processing documents, spreadsheet documents, Web documents, etc.

With the substantial amount of information being stored in electronic documents, it has become difficult to make such information accessible to users. For example, a vast amount of information is contained in web pages available via a browser and the Web. However, there are very few mechanisms available to facilitate access to this vast amount of information. One mechanism that is currently available is universal resource locator (URL) bookmarking, which can be used to bookmark an entire web page. The user can instruct the browser software to display the web page by selecting the bookmarked URL. Current URL bookmarking mechanisms operate to facilitate access to a web page. None of the current bookmarking mechanisms facilitate access to a selected portion of a web page.

As another example, electronic mail messages contain a plethora of information. Currently, email software applications provide a mechanism for flagging an entire email message and/or a mechanism for organizing messages using folders. The current flagging/bookmarking and folder organization mechanisms all operate to facilitate access to an electronic document. None of the current mechanisms facilitate access to a selected portion of an electronic document.

The novel systems and methods described herein enable a selected portion, or portions, of an electronic document to be bookmarked. This presents improvements to any system, software application, platform, etc. that manages, stores, provides, etc. electronic documents.

Embodiments of the present disclosure generate an extraction card (or bookmark card) of type bookmark for bookmarked contents corresponding to a selected portion of an electronic document. The bookmark card can comprise both user-specified data and automatically-generated data and metadata.

In accordance with one or more embodiments, a user can specify a portion of an electronic document to be bookmarked. In response, a bookmark card can be generated. The bookmark card can comprise information identifying the user-selected portion (or extracted portion) of the electronic document. In accordance with one or more embodiments, the bookmark card can comprise user-defined information, or annotations, such as and without limitation a title, note, one or more search keywords, etc. In accordance with one or more embodiments, the bookmark card can comprise automatically-generated information, such as an identifier (electronic document, or E-doc, ID) for the electronic document, information identifying the user (e.g., user ID), etc. By way of some non-limiting examples, the E-doc ID can be a message ID corresponding to an electronic message (e.g., an email), an article ID corresponding to an article, URL corresponding to a web page, etc.

In accordance with one or more embodiments, the bookmark card can comprise automatically-generated metadata associated with the bookmarked content. By way of a non-limiting example, a bookmark card's automatically-generated metadata can be based on a type (or category) of information included in the bookmarked content. By way of some non-limiting examples, types/categories of information can include without limitation address, phone number, sports score, stock ticker, etc. information. Each information type/category can have associated automatically-generated metadata. In some cases, the automatically-generated metadata can include at least one metadata item that can be dynamically updated (e.g., a sports score, a stock value, a current geographic distance (e.g., between a bookmarked address and another address), etc.).

Embodiments of the present disclosure can provide a number of user-selectable actions for creating, managing, interacting with, etc. bookmarked content, where the bookmarked content corresponds to a selected portion of an electronic document. By way of some non-limiting example, interacting with bookmarked content can comprise viewing, managing, flagging, organizing (e.g., by saving to a folder, or folders), searching, and communicating the bookmarked content. By way of a further non-limiting example, a bookmark list view can be provided to a user, where the listing comprises a number of entries, each entry corresponding to bookmarked content.

Figure 1:
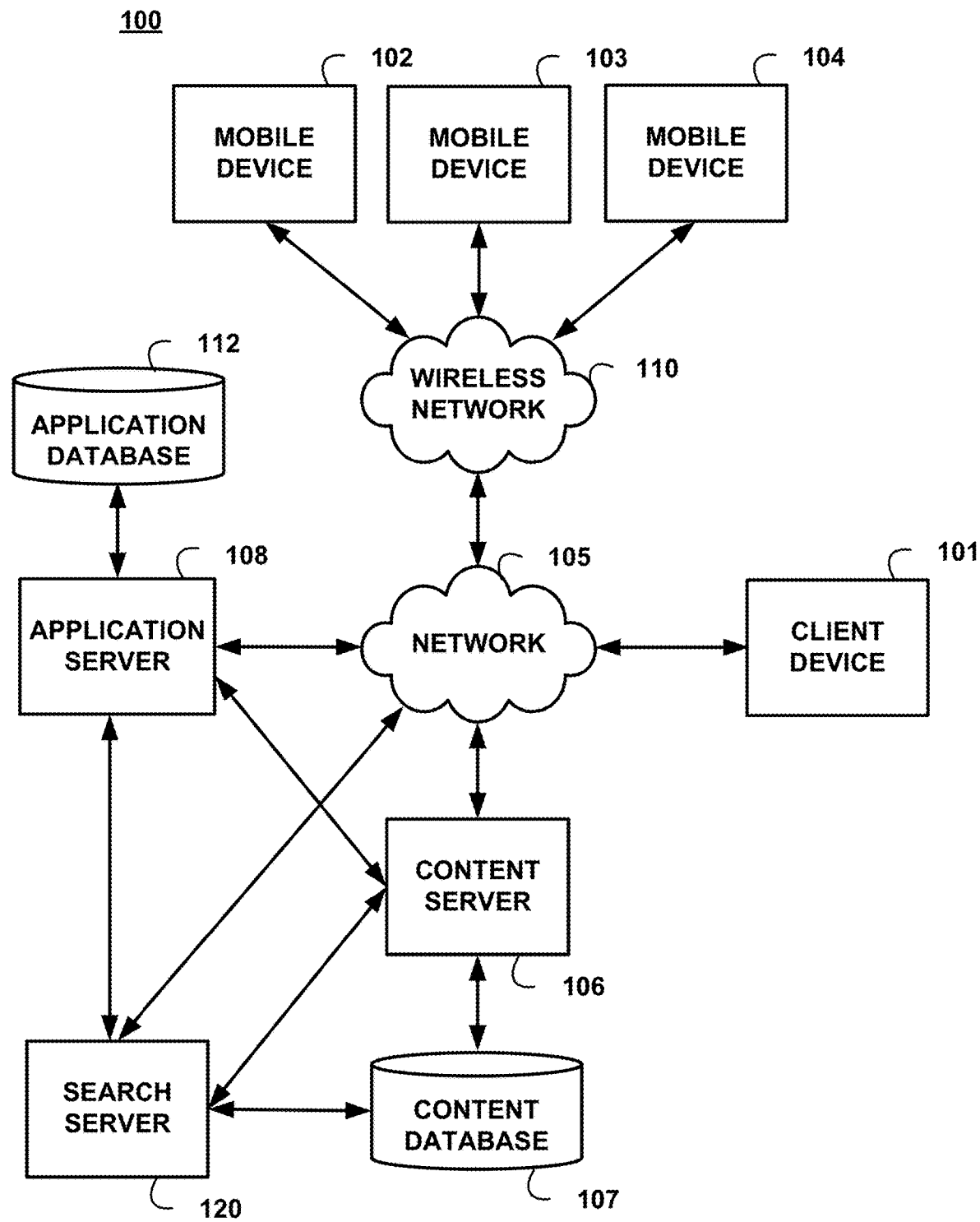
FIG. 1 is a schematic diagram illustrating an example of a network within which the systems and methods disclosed herein could be implemented according to one or more embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). In accordance with one or more embodiments, application server 108 can be configured to provide at least some portion of a bookmark engine, such as that shown in FIG. 3. Application server 108 can store data application database 112.

It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
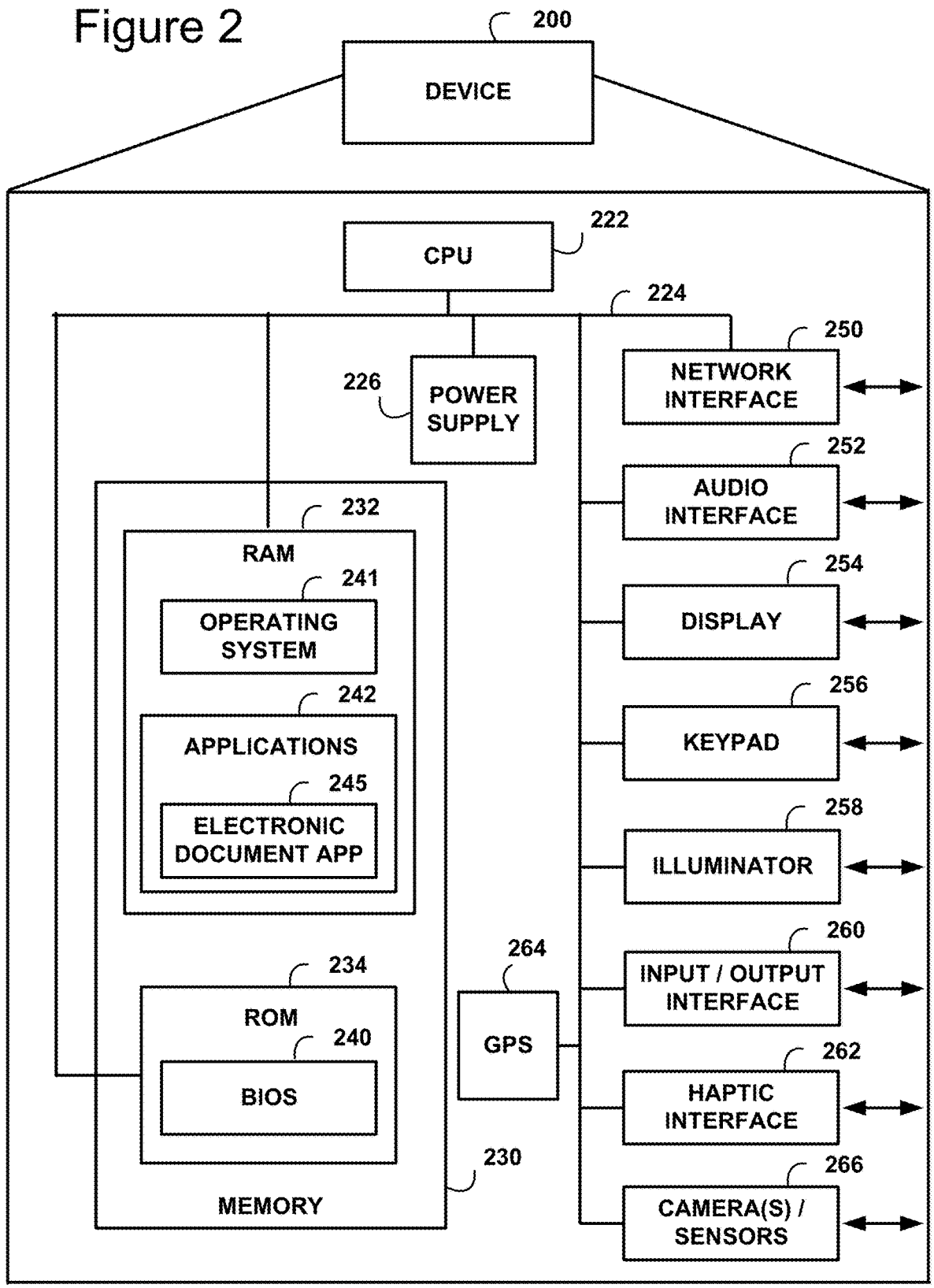
FIG. 2 depicts is a schematic diagram illustrating an example of client device in accordance with one or more embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, client device 101 and mobile devices 102-104 discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Device 200 may optionally communicate with a base station (not shown), or directly with another computing device. Network interface 250 includes circuitry for coupling device 200 to one or more networks, and is constructed for use with one or more communication protocols and technologies as discussed above.

Optional GPS transceiver 264 can determine the physical coordinates of device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of device 200 on the surface of the Earth. In an embodiment, device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like. At least a portion of the capability information may also be stored on a disk drive or other storage medium (not shown) within device 200.

Applications 242 may include computer executable instructions which, when executed by device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include an electronic document application (or app), or electronic document client, 245, which is discussed in more detail below. Although a single electronic document app is illustrated it should be clear that multiple electronic document apps may be employed to interact with the same or different types of electronic documents. For example, one electronic document app can be a browser app configured to interact with markup-language documents, an electronic mail messaging app configured to interact with email messages, a word processing app configured to interact with word processing documents, etc.

In accordance with one or more embodiments, applications 242 can include a search client (not shown) that is configured to send, to receive, and/or to otherwise process a search query and/or search result using any known or to be known communication protocols. Although a single search client is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
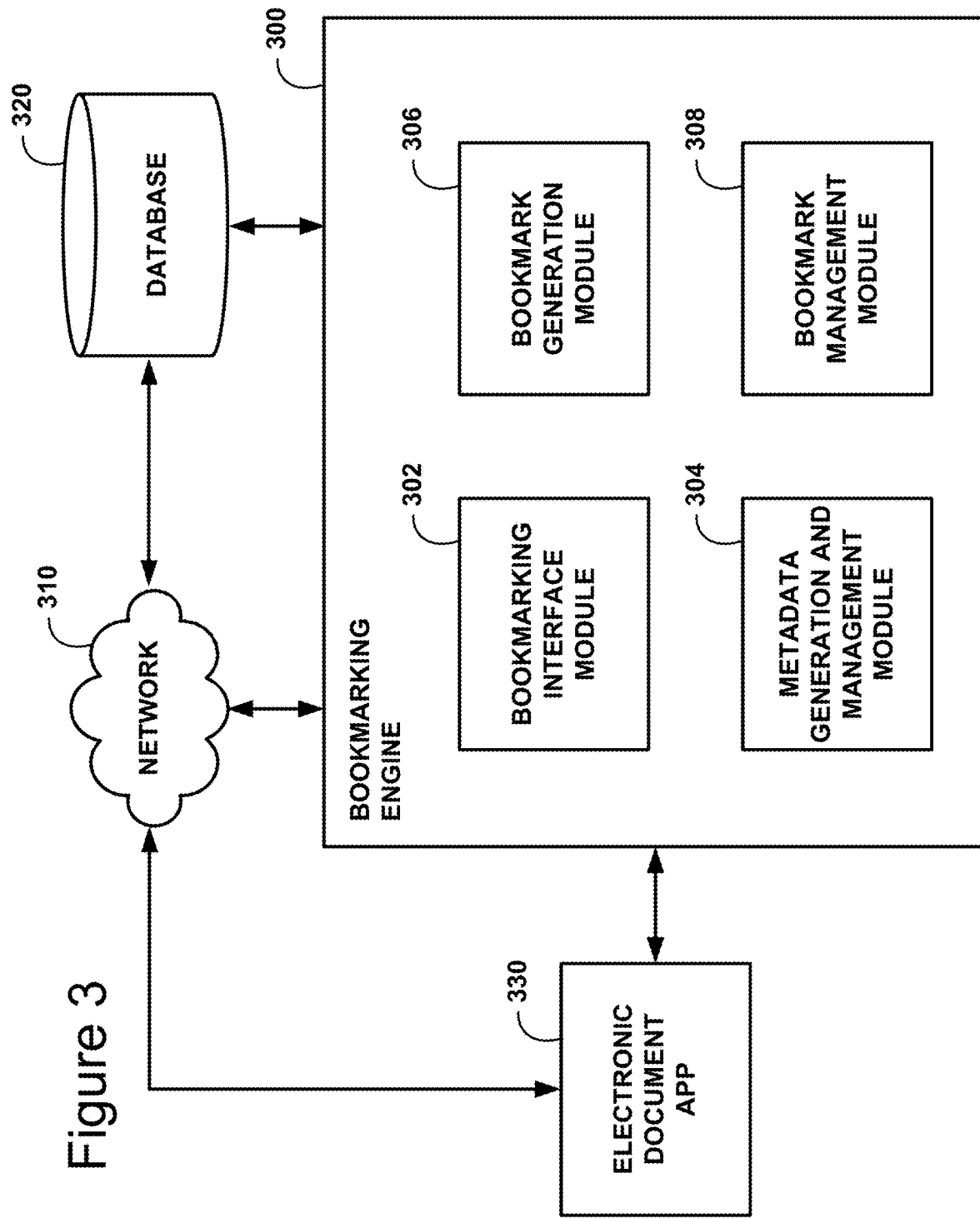
FIG. 3 is a schematic block diagram illustrating components of an exemplary system in accordance with one or more embodiments of the present disclosure.

FIG. 3 is a block diagram illustrating the components for performing the systems and methods discussed herein. FIG. 3 includes a bookmarking engine 300, network 310 and database 320. The bookmarking engine 300 can be a special purpose machine or processor and could be hosted by an application server, content server, social networking server, web server, search server, content provider, email service provider, ad server, user's computing device, and the like, or any combination thereof.

In accordance with one or more embodiments, electronic document app 330 can be configured to operate on electronic documents. By way of some non-limiting examples, electronic document app 330 can be a browser, an electronic messaging app, a word processing app, a spreadsheet app, etc.

According to some embodiments, bookmarking engine 300 can be embodied as a stand-alone application that executes on a user device (e.g., mobile device 102-104, client device 101 or the like). In some embodiments, bookmarking engine 300 can be embodied as part of an application (e.g., electronic document app 330) that executes on a user device. In some embodiments, the bookmarking engine 300 and/or electronic document app 330 can function as an application installed on the user's device, and in some embodiments, such application can be a web-based application accessed by the user device over a network. In some embodiments, the bookmarking engine 300 can be installed as an augmenting script, program or application to another media application (e.g., Yahoo!® Video, YouTube®, Hulu®, and the like).

The database 320 can be any type of database or memory, and can be associated with a content server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating and interacting with bookmarked content, electronic documents and bookmark cards, each bookmark card corresponding to a selected portion of one of the electronic documents.

Other user data can include device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store a bookmark card corresponding to bookmarked contents (or selected portion) of an electronic document. The bookmark card can comprise information identifying the bookmarked contents, information identifying an electronic document containing the bookmarked contents, user-defined data, and automatically-generated data and metadata. In addition to the information identifying the electronic document, the automatically-generated data can include bookmark creation information (e.g., date, time, user ID, etc.), update information (e.g., date, time, user ID, etc.), information indicating a location of the bookmarked contents in the electronic document, etc. In accordance with one or more embodiments, the bookmark card can comprise automatically-generated metadata, where the metadata can be automatically generated based on an information type(s)/category(ies) determined for information included in the bookmarked content.

In accordance with one or more embodiments, the information identifying the bookmarked content can comprise the bookmarked content and/or information that can be used for identifying/locating the bookmarked content within an electronic document.

While the discussion below will use, for illustrative purposes only, an email message (or email) as an electronic document, it should be apparent that any type of electronic document can be used with embodiments of the present disclosure. Discussion of email messages in connection with embodiments of the present disclosure should not be construed to limit the applications of the systems and methods discussed herein.

The network 310 can be any type of network such as, but not limited to, a wireless network, a local area network (LAN), wide area network (WAN), the Internet, or a combination thereof. The network 310 facilitates connectivity of the bookmarking engine 300, and the database of stored resources 320. Indeed, as illustrated in FIG. 3, the bookmarking engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as bookmarking engine 300, and includes bookmarking interface module 302, metadata generation and management module 304, bookmark generation module 306, and bookmark management module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the bookmarking engine 300 can be supplied to the database 320 in order to ensure that the information housed in the database 320 is up-to-date as the disclosed systems and methods leverage real-time information and/or behavior associated with bookmarked content and/or corresponding electronic document, as discussed in more detail below.

Figure 4:
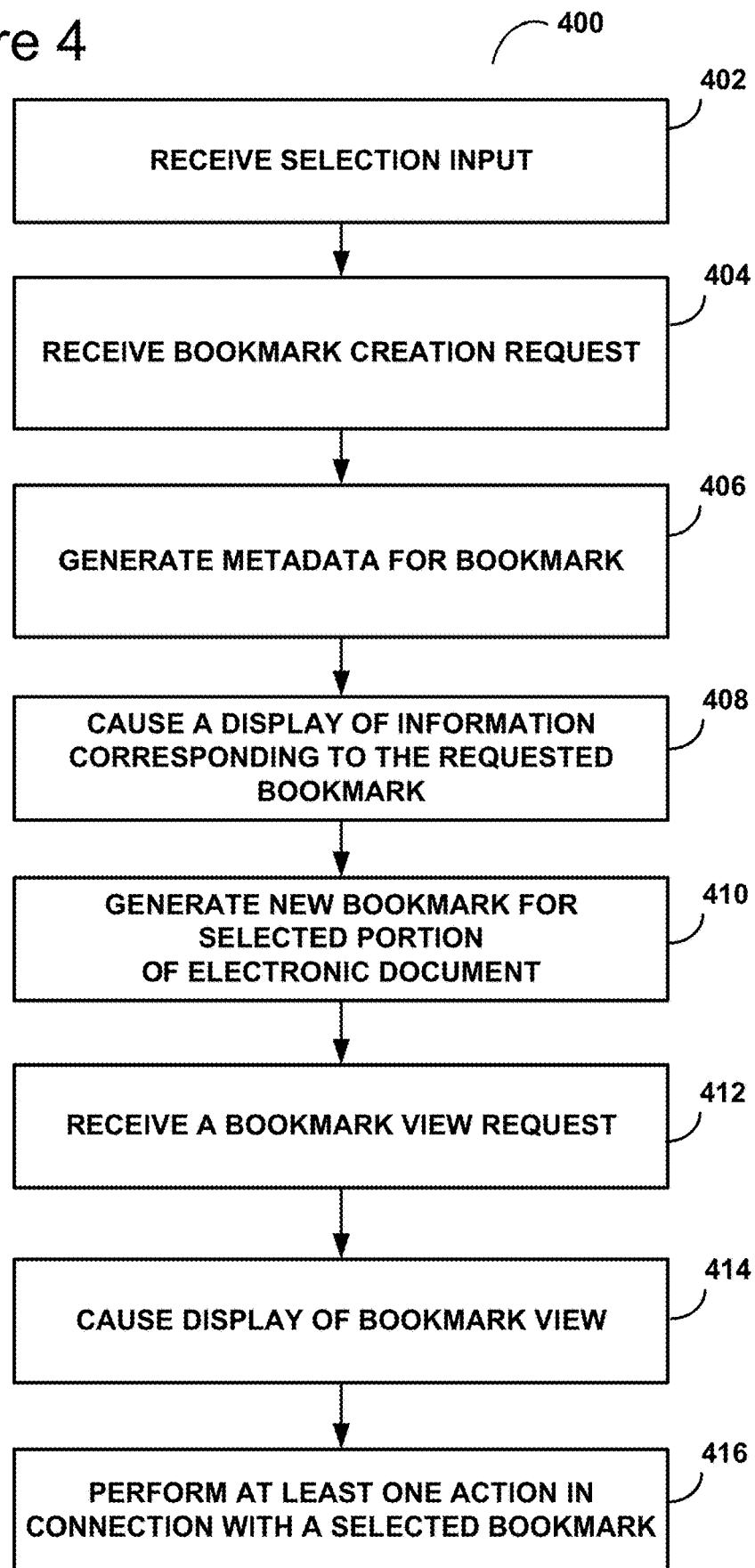
FIG. 4 is a flowchart illustrating steps performed in accordance with one or more embodiments of the present disclosure.

FIG. 4 provides a process flow overview in accordance with one or more embodiments of the present disclosure. Process 400 of FIG. 4 details steps performed in accordance with exemplary embodiments of the present disclosure for bookmarking a selected portion of an electronic document. According to some embodiments, as discussed herein with relation to FIG. 4, the process involves automatically receiving input indicating a selected portion of an electronic document and a corresponding request to bookmark the selected portion. Responsive to the request, a bookmark card can be generated. The bookmark card can comprise information identifying the electronic document, the selected portion of the electronic document, optional automatically-generated metadata, and optional user-defined items of information.

At step 402, selection input can be received. By way of a non-limiting example, step 402 can be performed by bookmarking interface module 302 of bookmarking engine 300. In accordance with one or more embodiments, bookmarking interface module 302 can comprise an Application Programming Interface (API) or other interfacing mechanism, which can be used by bookmarking engine 300 and electronic document app 330 to intercommunicate.

Electronic document app 330 can be configured to display a graphical user interface (GUI), where the GUI displays contents of an electronic document. The selection input received, at step 402, can identify a selected portion of the electronic document being displayed by electronic document app 330. As illustrated, electronic document app 330 can be an electronic mail (email) messaging app. As discussed herein, electronic document app 330 can be any application configured to operate on electronic documents.

Figure 5:
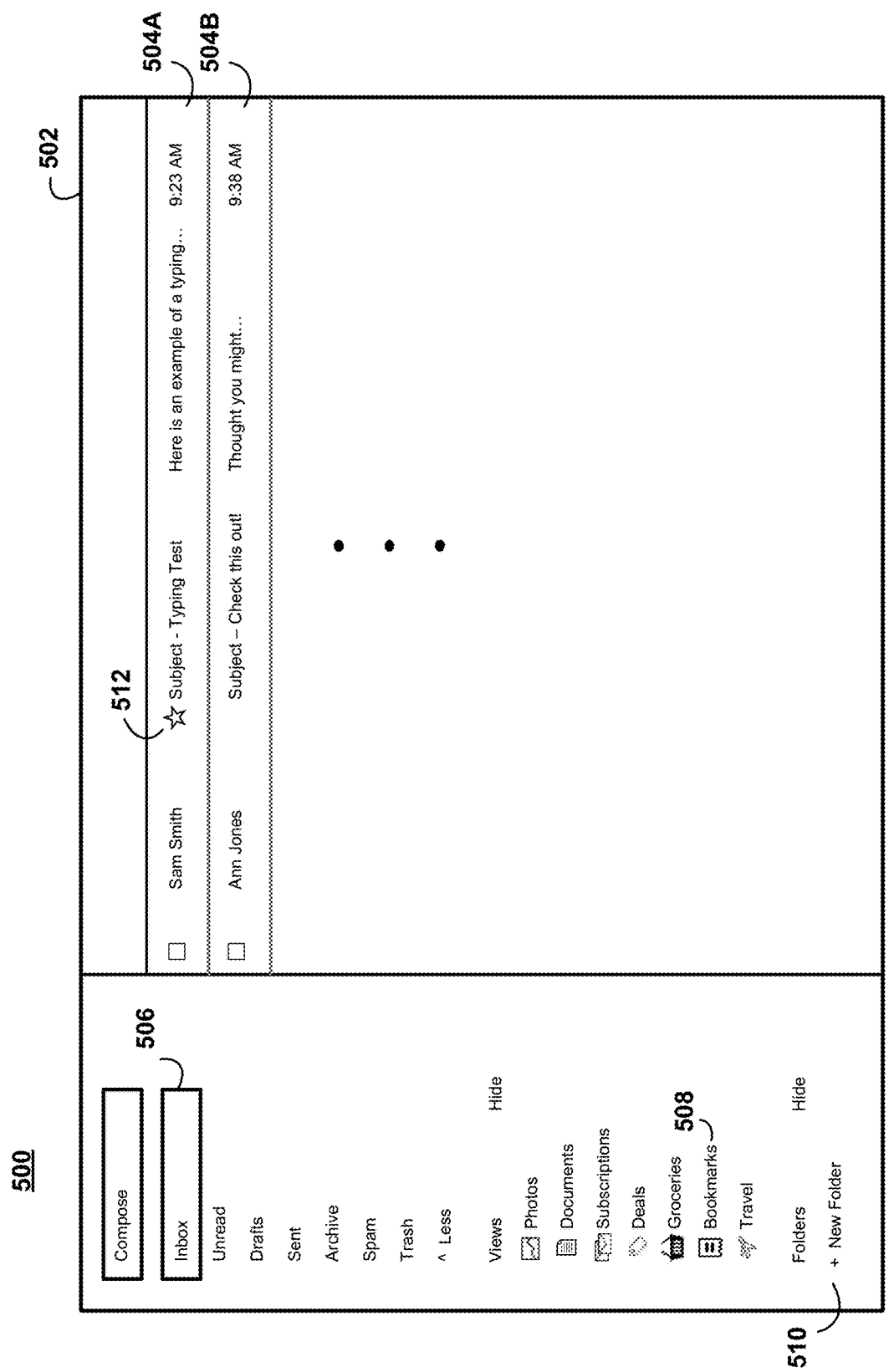

FIG. 5 provides an exemplary example of a GUI display which can be displayed at a user device via electronic document app 330. In example 500 shown in FIG. 5, GUI display 502 includes a number of entries referred to collectively as entries 504, where each entry corresponds to a received email message. By way of a non-limiting example, GUI display 502 can display email messages from a user-selected folder, such as the user's Inbox folder (or Inbox) 506. Entries 504A and 504B each correspond to a respective email message. Each email message is an electronic document with user-selectable portions. By way of some non-limiting examples, an email can comprise header, subject and body portions. The portion of content selected by the user for use in created bookmarked content can be include in header, subject, body, etc. portions of the email.

As shown in example 500, in addition to the user's Inbox 506, the user can create other folders, which the user can use to organize the user's email messages. By way of a non-limiting example, the user can save an email message to a new folder that the user created using "+ New Folder" 510. By way of a further non-limiting example, the user can flag an email message. In example 500, an email message corresponding to entry 504A is flagged as indicated by icon 512.

As discussed, current flagging and folder organization mechanisms operate on an entire email message (an email message corresponding to entry 504A, 504B). Current flagging and folder mechanisms do not provide an ability to operate on a selected portion of an email message. Embodiments of the present disclosure enable operation on a selected portion of an email message, or any other type of electronic document.

The selection input (received at step 402) can be received by bookmarking interface module 302 from electronic document app 330. The selection input can indicate selection of a portion of the electronic document displayed by the electronic document app 330.

According to some embodiments, electronic document app 330 can be a stand-alone application that executes on a user device (e.g., mobile device 102-104, client device 101 or the like). In some embodiments, electronic document app 330 can be embodied as part of an application that executes on a user device. In some embodiments, electronic document app 330 can function as an application installed on the user's device, and in some embodiments, such application can be a web-based application accessed by the user device over a network.

Referring again to FIG. 4, at step 404, a bookmark creation request is received. By way of a non-limiting example, step 404 can be performed by bookmarking interface module 302 of bookmarking engine 300. In accordance with one or more embodiments, the request can be received by bookmarking interface module 302 from electronic document app 330 via the API provided by bookmarking interface module 302.

The selection input (received at step 402) can be received by bookmarking interface module 302 from electronic document app 330. The selection input can indicate selection of a portion of the electronic document displayed by the electronic document app 330.

The selection input and bookmark creation request can be communicated (by electronic document app 330 to bookmarked interface module 302) together or separately. The selected portion of the electronic document can be identified by the user at any time in connection with a bookmark creation request (e.g., before, simultaneous with, after the bookmark creation request). Information identifying the electronic document (e.g., an eDoc ID) and the user (e.g., user ID) can be communicated by the electronic document app 330 to bookmarking interface module 302.

Figure 6:
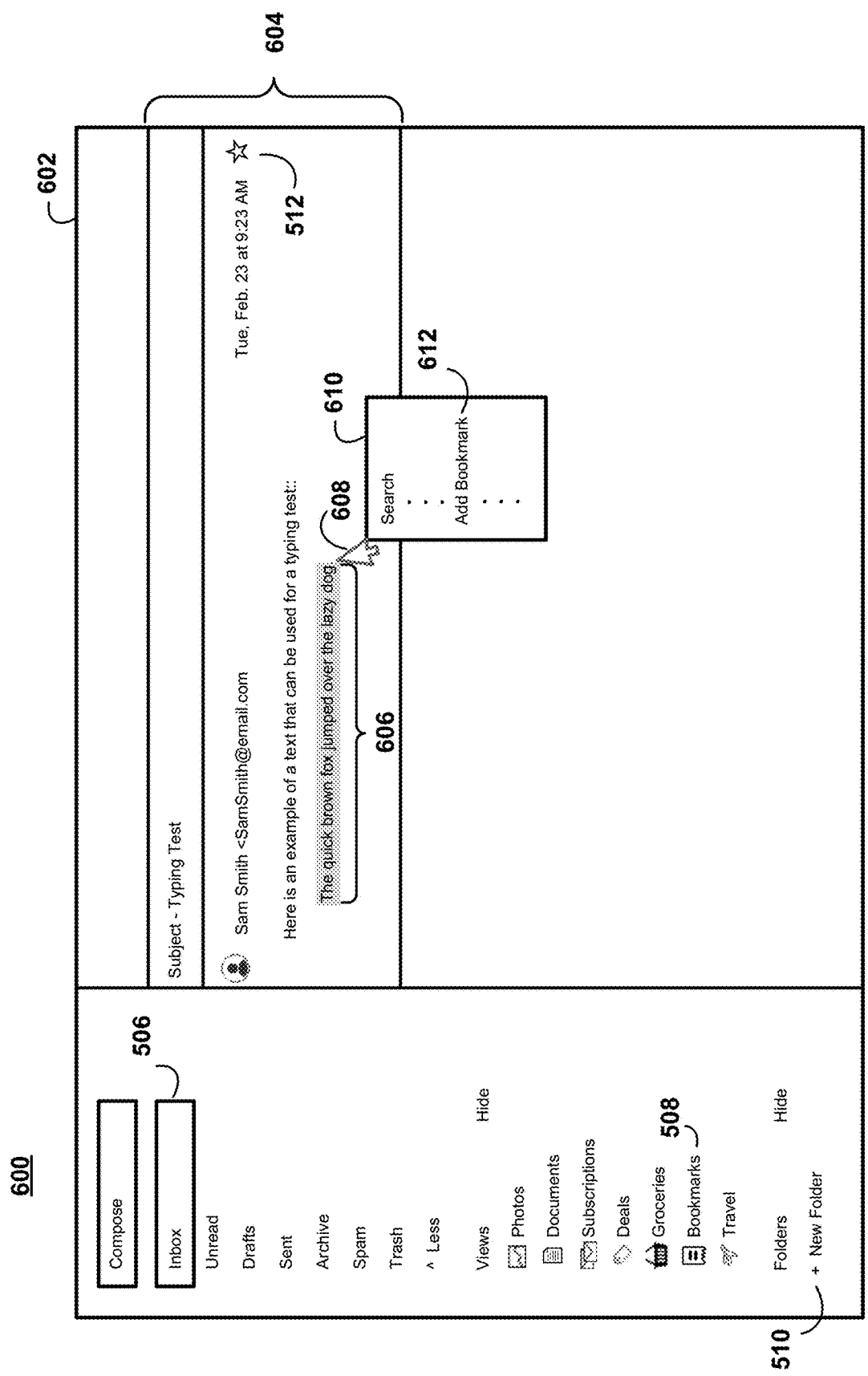

FIG. 6 provides an exemplary example of a GUI display of electronic document app 330 for use in accordance with one or more embodiments of the present disclosure. In example 600 of FIG. 6, GUI display 602 displays contents of an email message (e.g., header, subject, body, etc. contents). By way of a non-limiting example, GUI display 602 can be displayed in response to user selection of entry 504A (of FIG. 5). In accordance with one or more embodiments, the user can select a portion 606 of an electronic document (e.g., the email message shown in example 600) via GUI display (e.g., GUI display 602), and make a request to create a bookmark using the selected portion of the electronic document.

In example 600 shown in FIG. 6, the user can select portion 606 via cursor 608 (and an input device, such as a mouse). By way of a non-limiting example, the user can request to add/create a bookmark for the selected contents by selecting menu option 612 of menu 610. By way of a further non-limiting example, menu 610 can be displayed in response to input from the user (e.g., a click of a mouse button, such as the right mouse button). The user can select menu option 612 to make a request to create a bookmark using selected portion 606.

Referring again to FIG. 4, at step 406, metadata can be created for the bookmark. By way of a non-limiting example, step 406 can be performed by metadata generation and management module 304. In accordance with one or more embodiments, module 304 can analyze the selected portion 606 alone or in combination with other data (e.g., other contents of the electronic document, metadata from and/or associated with the electronic document, etc.) to determine a type (or category) of information corresponding to the selected content.

By way of a non-limiting example, the automatically-generated metadata corresponding to the requested bookmark can be based on a type/category of information included in the bookmarked content. By way of some non-limiting examples, bookmarked content can include an address and the metadata automatically generated for the bookmarked content can include a latitude and longitude corresponding to the address, a distance (e.g., a dynamically-updatable distance) to/from the bookmarked address and a given address (e.g., an address of the user, a current geolocation of a device of the user), etc. In a case that the bookmarked content is determined to include a phone number, the metadata can comprise a link for initiating a call to the bookmarked phone number, geographic location information determined using some or all of the bookmarked phone number, etc. In a case that the bookmarked content includes a sports score, the metadata can comprise the type of sport, team names, current score (which can be updated dynamically), etc. In a case that the bookmarked content includes a stock's ticker symbol, the metadata can include the name of the company corresponding to the ticker symbol, a current stock price, etc.

In accordance with one or more embodiments, the metadata automatically generated for bookmarked content can include dynamically-updatable information, such as a current sports score, stock value, a current geographic distance (e.g., between a bookmarked address and another address), etc.

Embodiments of the present disclosure can display the information associated with the requested bookmark, so that the user can confirm the information associated with the requested bookmark. At step 408, information corresponding to the requested bookmark can be caused to be displayed. By way of a non-limiting example, step 408 can be performed by bookmarking interface module 302 in communication (e.g., via its API) with electronic document app 330. By way of a non-limiting example, bookmarking interface module 304 can instruct electronic document app 330 to display GUI display 702 of FIG. 7. By way of a further non-limiting example, bookmarking interface module 302 can communicate display 702 and/or the information to be displayed in GUI 702 to electronic document app 330.

In example 700 of FIG. 7, GUI display 702 provides an exemplary example of a display of information corresponding to a requested bookmark. In accordance with one or more embodiments, GUI display 702 can include portion 704 displaying the selected portion 606 (e.g., the bookmarked contents), user-defined items of information shown in portion 706 of GUI display 702 and automatically-generated information (e.g., metadata information) shown in portion 708 of GUI display 702. An action portion 710 allows the user to terminate (e.g., "Undo/Cancel") the bookmark creation or continue with (e.g., "Submit") the new bookmark.

In accordance with one or more embodiments, the user can add one or more user-defined information items (via portion 706 of GUI display 702), such as and without limitation a title, note, one or more keywords, or the like.

As shown in example 700, portion 708 of GUI display 702 can display one or more items of information automatically-generated by bookmarking engine 300. In example 700, the automatically-generated information can include one or more items of metadata automatically generated by metadata generation and management module 304. A current value of an item of metadata can be displayed in a corresponding field in portion 708.

In accordance with one or more embodiments, the user can confirm the bookmark creation request by selecting the "Submit" button.

Referring again to FIG. 4, at step 410, a new bookmark can be generated for the selected portion of the electronic document. By way of a non-limiting example, step 410 can be performed by bookmark generation module 306. By way of a further non-limiting example, bookmark generation module 306 can generate a bookmark card for the selected portion 606 of the electronic document 604 shown in example 600 of FIG. 6.

In accordance with one or more embodiments, the bookmark card can be a type of extraction card used to store information for bookmarked content corresponding to a selected portion of an electronic document. The card can comprise user-specified data and automatically-generated data and metadata. As discussed, a user can specify a portion (e.g., portion 606) of an electronic document (electronic document 604) to be bookmarked. The bookmark card can comprise information identifying the electronic document, information identifying the selected portion of the electronic document as the corresponding bookmarked content and at least one user-defined data.

In accordance with one or more embodiments, the user-defined data can comprise information annotating the bookmarked content, such as and with limitation a title, note, one or more search keywords, etc.

In accordance with one or more embodiments, the information identifying the electronic document can comprise an identifier (electronic document, or E-doc, ID) for the electronic document. By way of some non-limiting examples, the E-doc ID can be a message ID corresponding to an electronic message (e.g., an email), an article ID corresponding to an article, URL corresponding to a web page, etc. The bookmark card can comprise information identifying the user (e.g., a user ID of the user) making the bookmark creation request.

In accordance with one or more embodiments, the card can comprise automatically-generated metadata associated with the bookmarked content. By way of a non-limiting example, a card's automatically-generated metadata can be based on a type/category of information included in the bookmarked content.

In accordance with one or more embodiments, the bookmark card can comprise other information, such as and without limitation, creation information (e.g., date and time of creation), update information (e.g., date and time of a latest update, each previous update, etc. Other information that can be included in the bookmark card includes information for locating the bookmarked content in the electronic document.

As discussed, location information indicating a location of the bookmarked content within the corresponding electronic document can be used to update the bookmarked content in response to an update to the electronic document involving the bookmarked content. The location information can comprise, for example, page, line, character location, etc. By way of a non-limiting example, in a case that the electronic document comprises markup language content, the location information can comprise information identifying the markup language element containing the bookmarked content. By way of a yet another non-limiting example, the location information can comprise information identifying a placeholder, or placeholders, in the electronic document, which can be delimiters for the bookmarked content. The placeholder(s) can be inserted in the electronic document in connection with the creation of a corresponding bookmark, and can be used to locate the bookmarked content within the electronic document. The placeholder(s) can be updated to reflect any change in the location of the bookmarked content within the associated electronic document.

In accordance with one or more embodiments, a bookmark card can be stored in database 320 by bookmark generation module 306.

At step 412, a bookmark view request can be received. By way of a non-limiting example, step 412 can be performed by bookmarking interface module 302. The bookmark view request can be made by a user using electronic document app 330. The bookmark view request can be communicated by electronic document app 330 and received by bookmarking interface module 302 via the API of bookmarking interface module 302.

By way of a non-limiting example, a bookmark view request can be received via GUI display 502 and the "Bookmarks" interface element (e.g., button, widget, etc.) 508. Interface element 508 can be selected by a user to request a bookmark view. Electronic document app 330 can forward the request to bookmarking engine 300 via the API of bookmarking interface module 302.

At step 414, a bookmark view can be caused to be displayed. By way of a non-limiting example, step 414 can be performed by bookmark management module 308. In accordance with one or more embodiments, bookmarking interface module 302 can forward the bookmark view request to bookmark management module 308. In accordance with one or more embodiments, the bookmark view request can include information identifying the user (e.g., a user ID). In response to receipt of the bookmark view request, bookmark management module 308 can instruct (e.g., via the API of bookmarking interface module 302) electronic document app 330 to display the requested bookmark view comprising bookmarked content (e.g., retrieved from database 320) for the user identified using the user ID, or other user identification information.

FIG. 8 provides an exemplary example of a bookmark view GUI display 802, which can be caused to be displayed by electronic management module 308 at a user's device via electronic document app 330 in response to a user's bookmark view request. In example 800 of FIG. 8, GUI display 802 can include a bookmark listing portion 810 that includes an entry corresponding to each of a number of bookmarks created by a respective user. Entry 804 can correspond to a bookmark created in connection with bookmarked contents corresponding to selected portion 606 shown in example 600 of FIG. 6.

As shown in example 800, a user can select an entry from bookmark listing portion 810, and perform any of a number of actions (e.g., view/edit, delete, send, save, flag, etc.). By way of a non-limiting example, a user can position cursor 812 within entry 804 (of bookmark listing portion 810) corresponding to a bookmark and click a mouse button (e.g., a right mouse button). In response, bookmark management module 308 can instruct electronic document app 330 to display menu 814 at the user's device.

In accordance with one or more embodiment, a user can select an entry from the bookmark listing portion 810 to open the electronic document containing the bookmarked content. By way of a non-limiting example, a user can position cursor 812 within entry 824 (of bookmark listing portion 810) and click a mouse button (e.g., a left mouse button) to select the bookmarked content. In response, bookmark management module 308 can instruct electronic document app 330 to open the electronic document corresponding to the selected bookmarked content. By way of a further non-limiting example, the bookmark card corresponding to the selected bookmarked content can be retrieved from database 320. The retrieved bookmarked card can be used to identify the eDoc ID associated with the selected bookmarked content, and the identified eDoc ID can be used to retrieve the corresponding electronic document from database 320. The eDoc ID can be used by bookmark management module 308 or electronic document app 330 to retrieve the electronic document corresponding to the selected bookmarked content (e.g., the bookmarked content displayed in entry 820 of the bookmark listing portion 810 of GUI display 802).

In accordance with one or more embodiments, an initial display of the electronic document (corresponding to the selected bookmarked content) can include a portion of the electronic document containing the bookmarked content. As discussed, the information included in a bookmark card can include a location of the bookmarked content within an electronic document. In accordance with one or more embodiments, the location information can be used to determine the initial display of the electronic document including the bookmarked content, so that the bookmarked content is at least included in the initial display of the electronic document.

Referring again to FIG. 4, at step 416, a least one action can be performed in connection with a selected bookmark. By way of a non-limiting example, the at least one action can be performed by bookmark management module 308. By way of a further non-limiting example, at least one action can be performed in connection with a bookmark selected from the bookmark view in GUI display 802. By way of yet another non-limiting example, the at least one action can be requested by a user via menu 814. As shown in example 800, menu 814 can comprise a number of entries corresponding to a number of actions selectable by the user. A selected action can be performed via bookmark management module 308.

The actions can include, without limitation, view/edit, delete, send, save to folder, and flag actions. The save to folder and flag actions enable the user to, respectively, save bookmarked content to a folder and flag bookmarked content. In response to user selection of either the save to folder or flag action, bookmark management module 308, alone or in conjunction with electronic document app 330, can save selected bookmarked content to a folder or flag the selected bookmarked content. The delete action enables the user to delete a selected bookmark. In response, bookmark management module 308 can delete the selected bookmark from database 320.

The send action enables the user to send bookmarked content (e.g., as an attachment to an email) to one or more recipients. The view/edit action 816 enables the user to view selected bookmarked content. In accordance with one or more embodiments, in response to user selection of view/edit action 816, bookmark management module 308 can retrieve the selected bookmarked content's information from database 320 and instruct electronic document app 330 to display GUI display 702 populated with the retrieved information. In accordance with one or more embodiments, one or more of the metadata fields in portion 708 of GUI display 702 can display dynamic information (e.g., sports score, ticker symbol's stock value, a current geographic distance (e.g., between a bookmarked address and another address), etc.). Bookmark management module 308 can be configured to determine a current value for the dynamic metadata information and provide the current value to electronic document app 330 for display in a corresponding metadata field in portion 708 of GUI display 702.

In accordance with one or more embodiments, a user can edit the information displayed in one or more fields in portion 706 of GUI display 702, and make a request (e.g., via a submit button) to update the bookmarked content's bookmark card. By way of a non-limiting example, electronic document app 330 can submit the changes to bookmark management module 308 via the API of bookmarking interface module 302. In response, bookmark management module 308 can update corresponding information in the bookmarked content's bookmark card in database 320.

Referring again to FIG. 8, as shown in example 800, GUI display 802 can include a search capability for bookmark searches. By way of a non-limiting example, a user can enter one or more keywords in field 806 and select search element 808 to view a number of entries, each corresponding to bookmarked content, based on the one or more keywords.

The entries displayed in bookmark listing portion 810 can be ordered based on any sorting criteria, such as and without limitation by creation/update date, alphabetically, relevance (e.g., search relevance), flagged vs. unflagged, etc. Portion 818 of GUI display 802 can include an "close" element to close GUI display 802.

In accordance with one or more embodiments, bookmark management module 308 can be configured to automatically update a bookmark card stored in database 320 to reflect a change to the bookmarked content. For example, with reference to example 600 of FIG. 6, some or all of selected portion 606 might be changed by the user. In a case that a copy of the selected portion 606 is saved in a corresponding bookmark card in database 320, bookmark management module 302 can update the saved copy to reflect the changes made by the user.

As shown in FIG. 9, internal architecture of a computing system 900 includes one or more processing units, processors, or processing cores, (also referred to herein as CPUs) 912, which interface with at least one computer bus 902. Also interfacing with computer bus 902 are computer-readable storage medium, or media, 906, network interface 914, memory 904, e.g., random access memory (RAM), run-time transient memory, read only memory (ROM), media disk drive interface 908 as an interface for a drive that can read and/or write to media, display interface 910 as interface for a monitor or other display device, keyboard interface 916 as interface for a keyboard, pointing device interface 918 as an interface for a mouse or other pointing device, CD/DVD drive interface 920, and miscellaneous other interfaces (or Misc. Other Interface(s) 922 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein.

Persistent storage, e.g., medium/media 906, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing video data for presentation at a display coupled to display interface 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 912 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
receiving, at a computing device, via a graphical user interface (GUI) display of an electronic document, user input indicating selection of a portion of the electronic document;
receiving, at the computing device, from the user via the GUI, a request to bookmark the selected portion of the electronic document, the bookmark request comprising at least one user-defined information item;

generating, via the computing device, a bookmark card for the selected portion of the electronic document, the bookmark card comprising information identifying the electronic document, the bookmark card further comprising, as part of the bookmark card, the selected portion of the electronic document as bookmarked content and the at least one user-defined information item;

receiving, via the computing device, a bookmark view request via the GUI; and causing, via the computing device, display of the bookmark view via the GUI in response to the bookmark view request, the bookmark view comprising an entry corresponding to the generated bookmark card and providing the bookmarked content retrieved from the generated bookmark card, the bookmark view providing a number of actions selectable by the user in connection with the entry from the bookmark view.

2. The method of claim 1, the bookmark view comprising the entry corresponding to the generated electronic document further comprising a number of other entries, a respective entry of the number of other entries providing the bookmarked content corresponding to a corresponding bookmark card.

3. The method of claim 2, further comprising:
receiving entry selection input indicative of the user's selection of one of the number of other entries from the bookmark view;
using a second bookmark card corresponding to the one of the number of other entries from the bookmark view to identify a second electronic document containing second bookmarked content; and
displaying the second electronic document via the GUI in response to receipt of the entry selection input.

4. The method of claim 3, displaying the second electronic document further comprising displaying the second electronic document such that the second bookmarked content is at least initially displayed.

5. The method of claim 1, the electronic document is one of a plurality of electronic documents for which a bookmark card is generated, and the bookmark view displays bookmarked content corresponding to each bookmark card generated for each electronic document of the plurality of electronic documents.

6. The method of claim 1, further comprising:
analyzing at least the selected portion of the electronic document, and based on the analysis, identifying metadata related to the bookmarked content, the bookmark card generated for the selected portion of the electronic document further comprising the identified metadata related to the bookmark content.

7. The method of claim 6, the analysis identifying a content category for the bookmarked content, the metadata is identified based on the identified content category.

8. The method of claim 6, at least a portion of the metadata comprising dynamically-updatable metadata.

9. The method of claim 8, causing the display of the bookmark view further comprising:
determining an update for the dynamically-updatable metadata related to the bookmark content of the entry corresponding to the generated bookmark card, the entry comprising the determined update to the dynamically-updatable metadata.

10. The method of claim 1, the number of actions selectable by the user in connection with the entry from the bookmark view comprising a send action enabling the user to send the bookmarked content to a message recipient.

11. The method of claim 1, the number of actions selectable by the user in connection with the entry from the bookmark view comprising a delete action enabling the user to delete the generated bookmark card corresponding to the entry from the bookmark view.

12. The method of claim 1, further comprising:
receiving information indicating an update to the electronic document, the update involving the bookmarked content for the generated bookmark card; and
updating the bookmark card in accordance with the update to the electronic document.

13. The method of claim 1, the at least one user-defined information item selected from a group consisting of title, one or more keywords and a note.

14. A non-transitory computer-readable storage medium tangibly encoded with computer-executable instructions that when executed by a processor associated with a computing device perform a method comprising:
receiving, via a graphical user interface (GUI) display of an electronic document, user input indicating selection of a portion of the electronic document;
receiving, from the user via the GUI, a request to bookmark the selected portion of the electronic document, the bookmark request comprising at least one user-defined information item;
generating a bookmark card for the selected portion of the electronic document, the bookmark card comprising information identifying the electronic document, the bookmark card further comprising, as part of the bookmark card, the selected portion of the electronic document as bookmarked content and the at least one user-defined information item;
receiving a bookmark view request via the GUI; and
causing display of the bookmark view via the GUI in response to the bookmark view request, the bookmark view comprising an entry corresponding to the generated bookmark card and providing the bookmarked content retrieved from the generated bookmark card, the bookmark view providing a number of actions selectable by the user in connection with the entry from the bookmark view.

15. The non-transitory computer-readable storage medium of claim 14, the bookmark view comprising the entry corresponding to the generated electronic document further comprising a number of other entries, a respective entry of the number of other entries providing the bookmarked content corresponding to a corresponding bookmark card.

16. The non-transitory computer-readable storage medium of claim 15, further comprising:
receiving entry selection input indicative of the user's selection of one of the number of other entries from the bookmark view;
using a second bookmark card corresponding to the one of the number of other entries from the bookmark view to identify a second electronic document containing second bookmarked content; and
displaying the second electronic document via the GUI in response to receipt of the entry selection input.

17. The non-transitory computer-readable storage medium of claim 16, displaying the second electronic document further comprising displaying the second electronic document such that the second bookmarked content is at least initially displayed.

18. The non-transitory computer-readable storage medium of claim 14, the electronic document is one of a plurality of electronic documents for which a bookmark card is generated, and the bookmark view displays bookmarked content corresponding to each bookmark card generated for each electronic document of the plurality of electronic documents.

19. The non-transitory computer-readable storage medium of claim 14, further comprising:

analyzing at least the selected portion of the electronic document, and based on the analysis, identifying metadata related to the bookmarked content, the bookmark card generated for the selected portion of the electronic document further comprising the identified metadata related to the bookmark content.

20. A computing device comprising:

a processor; and a non-transitory storage medium for tangibly storing thereon program logic for execution by the processor, the program logic comprising:

receiving logic executed by the processor for receiving, via a graphical user interface (GUI) display of an electronic document, user input indicating selection of a portion of the electronic document;

receiving logic executed by the processor for receiving, from the user via the GUI, a request to bookmark the selected portion of the electronic document, the bookmark request comprising at least one user-defined information item;

generating logic executed by the processor for generating a bookmark card for the selected portion of the electronic document, the bookmark card comprising information identifying the electronic document, the bookmark card further comprising, as part of the bookmark card, the selected portion of the electronic document as bookmarked content and the at least one user-defined information item;

receiving logic executed by the processor for receiving a bookmark view request via the GUI; and causing logic executed by the processor for causing display of the bookmark view via the GUI in response to the bookmark view request, the bookmark view comprising an entry corresponding to the generated bookmark card and providing the bookmarked content retrieved from the generated bookmark card, the bookmark view providing a number of actions selectable by the user in connection with the entry from the bookmark view.

\* \* \* \* \*